UNITED STATES PATENT OFFICE.

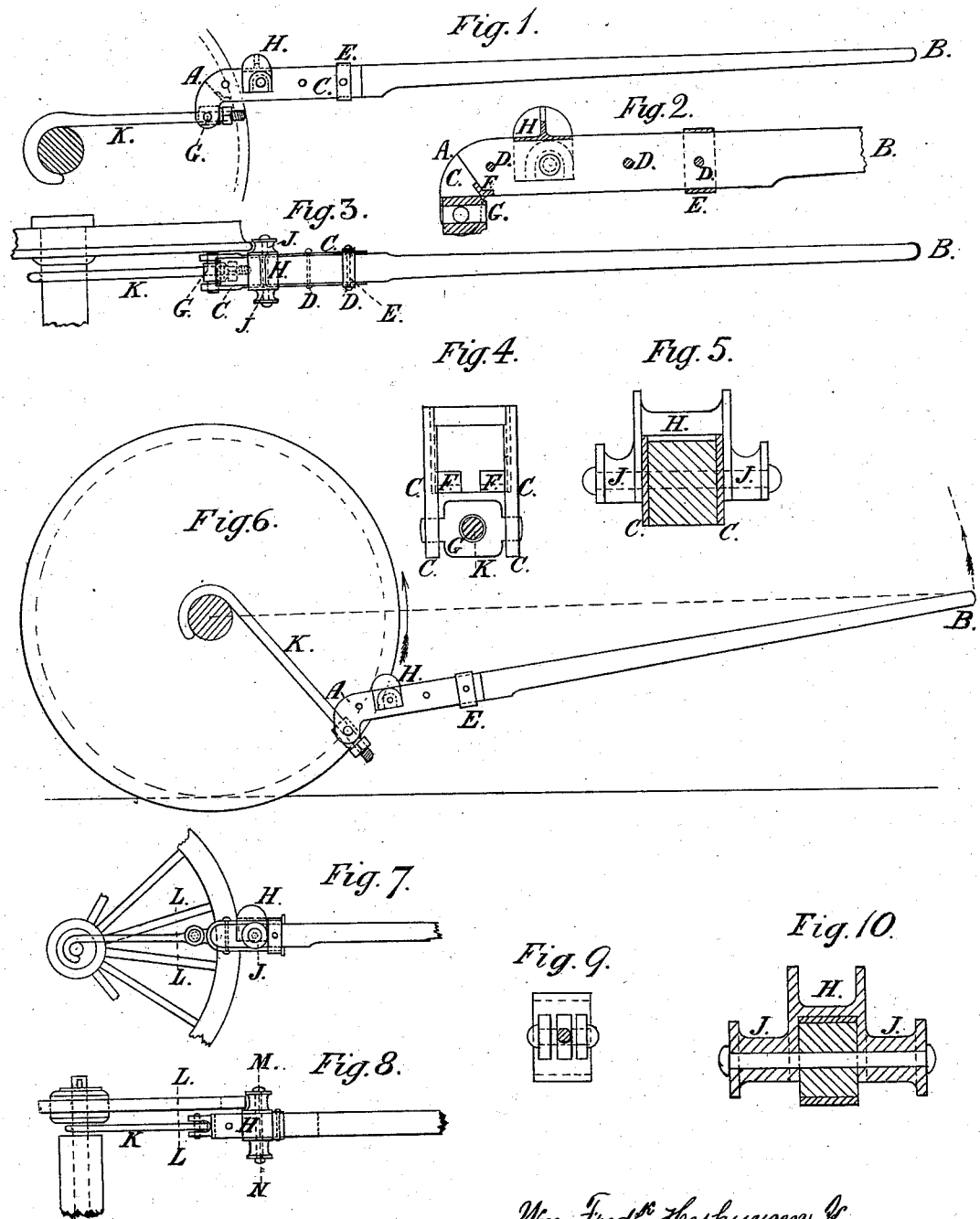

WILLIAM F. HESHUYSEN, OF AMSTERDAM, HOLLAND, AND CHARLES BURN, OF LONDON, ENGLAND.

IMPROVEMENT IN CAR-MOVERS.

Specification forming part of Letters Patent No. 192,866, dated July 10, 1877; application filed March 27, 1876.

*To all whom it may concern:*

Be it known that we, WILLIAM FREDERICK HESHUYSEN, of Amsterdam, Holland, and CHARLES BURN, of London, in the Kingdom of England, have invented new and useful Improvements in Apparatus for Propelling or Shunting Railway Rolling-Stock, applicable also to other vehicles; and we do hereby declare that the following is a full and exact description thereof, when taken in connection with the accompanying drawings, forming part of this specification, reference being had to the figures and letters marked thereon— that is to say:

The object of this invention is to facilitate the propelling or shunting by manual labor of railway rolling-stock, gun-carriages, and other vehicles, by means of a two-armed lever, one arm being hung or supported by the axle of the wheel of the carriage or vehicle to be propelled, the end of this arm being bent semicircular to fit the periphery of the axle, and the other end attached to the end of the other arm by a joint forming the fulcrum or center of motion, the fulcrum being situated intermediate between the axle and the periphery of the wheel, so that when the lever is radiated up and down, the lever and wheel rotate on different centers.

On the accompanying sheet of drawings, Figure 1 is a side elevation; Fig. 2, a longitudinal section; Fig. 3, a top view; Fig. 4, an end view at the line marked A, Figs. 1 and 2; Fig. 5, a cross-section of the long lever and front view of the saddle; Fig. 6, a side view of the apparatus applied to a wheel and axle of a railway-carriage in position for action, the direction of motion being indicated by the arrows; Fig. 7, a side view, and Fig. 8 a plan view, of a modified apparatus to be applied to an ordinary vehicle or gun-carriage; Fig. 9, an end view at the line marked L, Figs. 7 and 8; and Fig. 10, a cross-section of the lever and saddle at the line M N.

I employ a lever, A B, Figs. 1, 2, 3, and 6, of wood or other suitable material, strengthened at the end A by means of two iron side plates, C C, of the same depth as the lever A B, which side plates are fastened to the lever by rivets D D D, passing transversely through the side plates and the lever. I further hold the side plates C C to the lever A B by an iron hoop or band, E, which clasps the lever and side plates.

The iron side plates C C extend for a short distance beyond the end A of the lever A B, the portion so extending being shaped to the form shown in Figs. 1 and 2. Each side plate has a projection, F, cast, welded, or riveted to the inside of the plate in the position and of the sectional form shown in Fig. 2, which projection forms a seat or bearing for the end A of the lever, and through the two ends of the side plates C C holes are punched or bored, for the insertion of the trunnions of a joint or swivel, G, inserted between the two side plates C C, the trunnions of the swivel passing through the two holes in the ends of the side plates, so that the swivel can turn freely round, the trunnions acting as transverse centers, and through the longitudinal center of the swivel G is cast or bored a hole in a direction at right angles to its axis for the insertion of the iron arm K.

At some distance from the center of the trunnions of the swivel G, in the direction A to B, a cast-iron saddle, H, is seated on the lever A B, which saddle is, in cross-section, of the form of the letter H, and when fixed to the lever A B the upper part forms two cheeks, and the lower part spans and clasps the lever. Two lugs, J J, are cast onto each side of the saddle, projecting from the side of the lever, and so as to fit loosely the flange of the wheel of the carriage to be propelled.

The saddle and lugs are fixed to the lever by a bolt or rivet, which passes transversely through the center of the two lugs and the lever.

The iron arm K, which is of a length to suit the dimensions of the wheel of the carriage to be propelled, is inserted through a hole in the swivel G, one end of the arm being curved so as to form a hook to fit the axle of the carriage to be propelled, the other end having a screw-thread and nut, so as to adjust the length of the arm to suit the various diameters of the wheels of the carriages to be propelled. The arm and hook K, by passing through the swivel G, and being held to it by the screwnut, becomes attached to the lever A B, the trunnions of the swivel G forming the axes of motion, so that the arm K can move round them as a center, thereby enabling the lever A B and the arm K to take a position at any required angle.

When required to be applied to propel a railway carriage or truck the apparatus is hung onto the axle of the carriage to be propelled, close to the inside of the wheel, by means of the iron arm and hook K, and placed in the position shown in Fig. 1, so that the lever and arm are parallel with each other. The length of the arm is then adjusted by the screw and nut, so that the side lug in front of the flange of the wheel is about one inch distant from the rim of the flange of the wheel in the direction of the radius of the wheel.

When the end A of the lever A B is allowed to drop, and with it the arm K, as shown in Fig. 6, the distance between the side lug and the periphery of the wheel is consequently lessened, and the side lug in front of the flange comes into contact with the rim of the flange. Upon raising the lever A B at the end B the side lug is pressed against the rim of the flange of the wheel in proportion to the force applied, and becomes fixed, and upon continuing to raise the lever the wheel is caused to revolve in the same direction, and by that means the carriage is propelled.

The arrangement of apparatus as above described, and illustrated in Figs. 1, 2, 3, 4, 5, and 6, is preferred; but it is not necessary that the swivel G should be inserted and attached direct to the side plates C C; but the swivel G may be inserted between two separate pieces riveted to the side plates. Nor is it necessary in all cases to strengthen the lever A B by means of iron side plates, nor that the respective positions vertically of the center of the trunnions of the swivel G and the center of the side lugs should be always the same; but the apparatus may be constructed as shown in Figs. 7, 8, 9, and 10, where it is shown applied to an ordinary vehicle or an artillery gun-carriage.

For the working of the apparatus it is, however, essential that the arm and hook should be of such a length that when the lever is attached to the axle of the carriage to be propelled the center of the swivel, pinion, or bolt, which forms the center of motion of the lever and the arm, should always be intermediate between the periphery and center of the wheel of the carriage to be propelled.

We do not wish to be understood as broadly claiming a lever and hook to be applied, respectively, to the rim and axle of a railway-wheel to aid in moving the same, as such, we are aware, is not new; but What we do claim is—

1. The combination of the lever A B, with shoulders upon opposite sides, the swivel G, hung in the end of said lever, and the hooked arm K, adjustably attached to said swivel, substantially as described.

2. The combination of the lever A B, the saddle H, the projecting lugs J J, formed thereon and arranged on the said lever, the swivel G, and adjustable arm K, all substantially as and for the purpose described.

In testimony whereof we have hereunto set our hands this 15th day of September, 1875.

W. F. HESHUYSEN.
CHARLES BURN.

Witnesses:
W. A. BARLOW,
D. REID,
    123 *Chancery Lane, London.*